United States Patent [19]

Furuya

[11] Patent Number: 5,784,078
[45] Date of Patent: Jul. 21, 1998

[54] RECORDER AND PRINT CONTROL METHOD USING VARIOUS PRINT PATTERNS TO PRINT PRESCRIBED AREAS BY A PLURALITY OF SCANS

[75] Inventor: Masami Furuya, Ebina, Japan

[73] Assignee: Fuji Xerox Co., Ltd., Tokyo, Japan

[21] Appl. No.: 663,363

[22] Filed: Jun. 13, 1996

[30] Foreign Application Priority Data

Jun. 21, 1995 [JP] Japan ................................. 7-154617

[51] Int. Cl.⁶ .............................. B41J 29/38; B41J 2/145
[52] U.S. Cl. ......................................... 347/14; 347/41
[58] Field of Search .............................. 347/40, 41, 12, 347/9, 14, 43

[56] References Cited

U.S. PATENT DOCUMENTS

| | | | |
|---|---|---|---|
| 4,272,771 | 6/1981 | Furukawa | 346/75 |
| 4,748,453 | 5/1988 | Lin et al. | 346/1.1 |
| 5,059,984 | 10/1991 | Moore et al. | 346/1.1 |
| 5,428,380 | 6/1995 | Ebisawa | 347/35 |
| 5,541,625 | 7/1996 | Holstun et al. | 347/5 |
| 5,598,191 | 1/1997 | Kneezel | 347/40 |
| 5,600,353 | 2/1997 | Hickman et al. | 347/43 |
| 5,667,714 | 9/1997 | Klassen et al. | 347/9 |
| 5,686,944 | 11/1997 | Takagi et al. | 347/41 |

FOREIGN PATENT DOCUMENTS

| | | |
|---|---|---|
| A-0 622 212 | 11/1994 | European Pat. Off. ......... B41J 2/205 |
| A-60-9760 | 1/1985 | Japan. |
| A-60-107975 | 6/1985 | Japan. |
| A-3-207665 | 9/1991 | Japan. |
| A-6-55296 | 3/1994 | Japan. |

OTHER PUBLICATIONS

Patent Abstracts of Japan, vol. 11, No. 160, "Printer", Masakazu Arakaki et al., May 23, 1987, Abstract Only & Accompanying Abstract Figure.

*Primary Examiner*—Safet Metjahic
*Assistant Examiner*—Christopher E. Mahoney
*Attorney, Agent, or Firm*—Oliff & Berridge, PLC

[57] ABSTRACT

Line feed is performed for blank lines and the head is positioned at FIG. 11B for the image to be printed which is indicated at FIG. 11A. In this state, the first printing is performed in a striped pattern in the recording areas (4) and (6). This improves print quality of a straight line following a blank part. After line feeding, the head is positioned at FIG. 11C. The second printing is performed in a striped pattern which interpolates the first printing in the recording areas (4) and (6). Simultaneously, the first printing is performed in a checkered pattern in the recording areas (5) and (7) to improve the quality of the extensive image.

16 Claims, 14 Drawing Sheets

FIG. 3
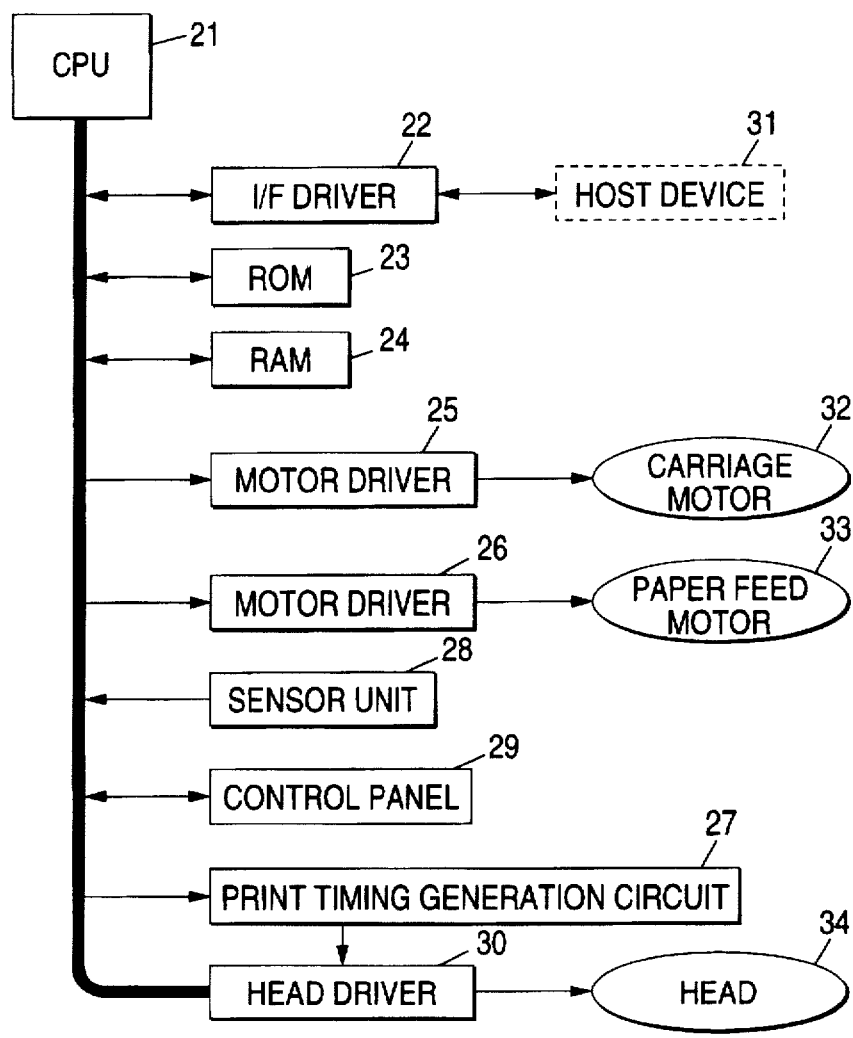
FIG. 4A  FIG. 4B  FIG. 4C  FIG. 4D
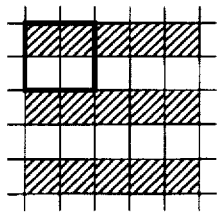 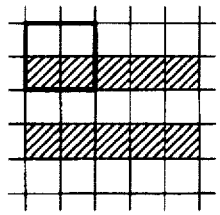 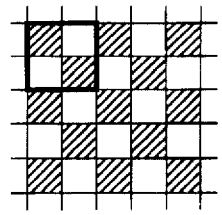 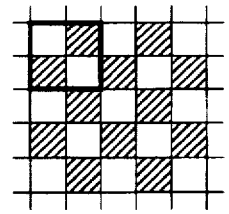

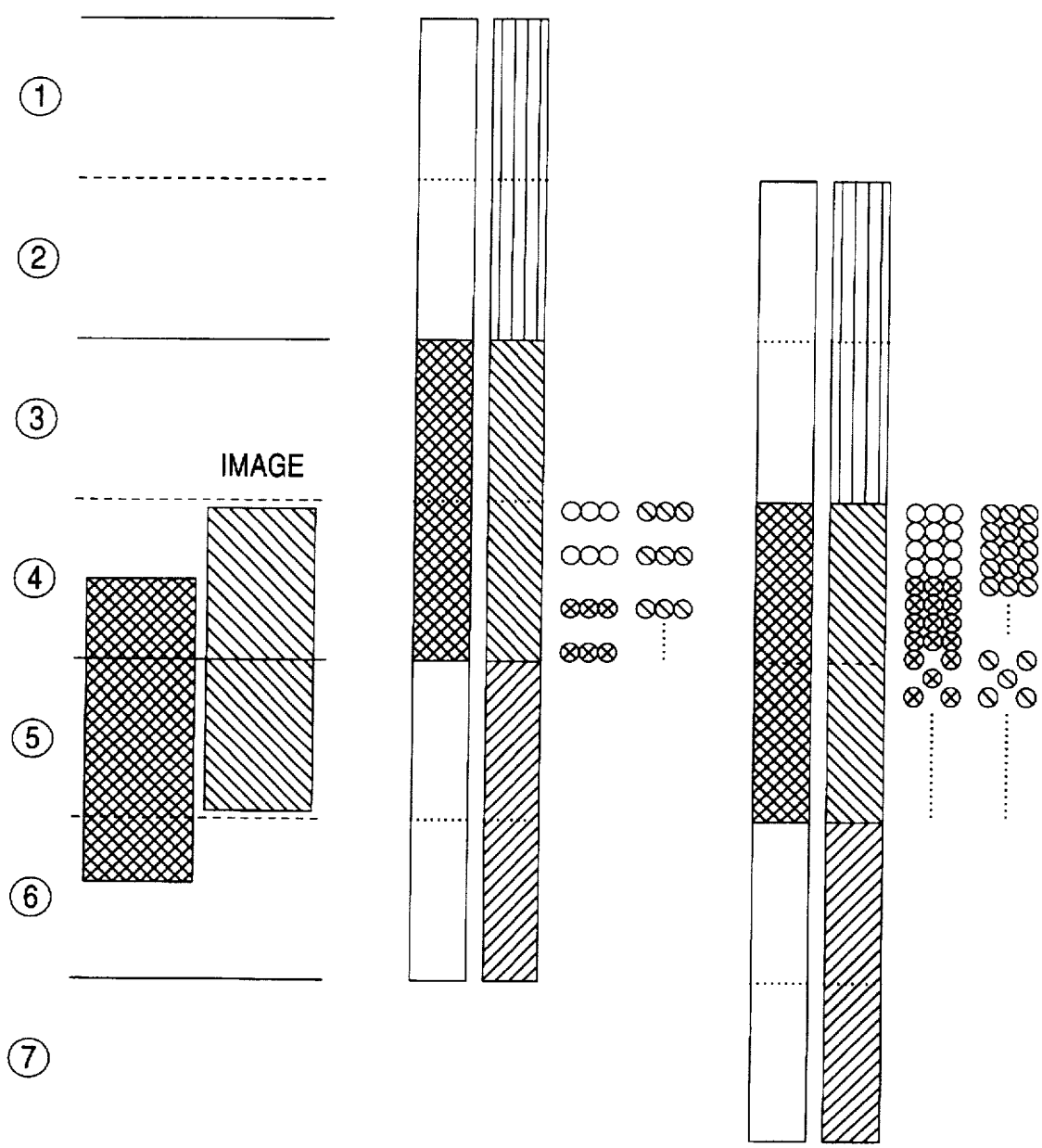

FIG. 15A  FIG. 15B
FIG. 15C
FIG. 15D
FIG. 15E  FIG. 15F
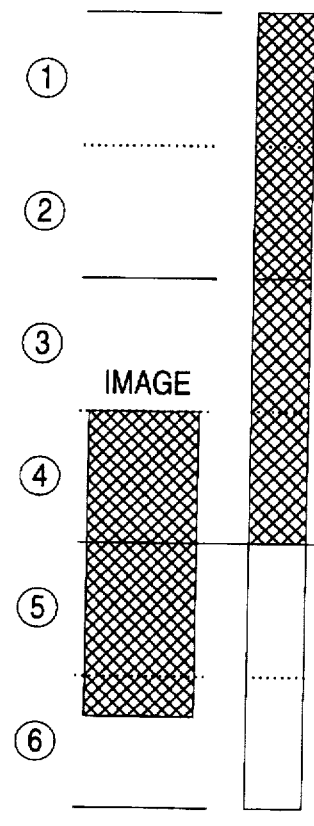
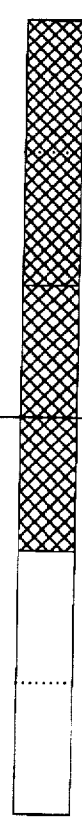
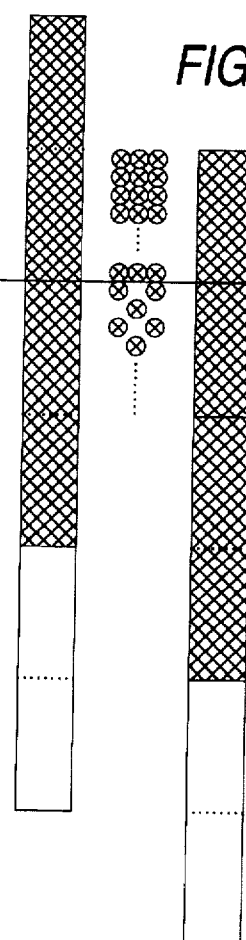
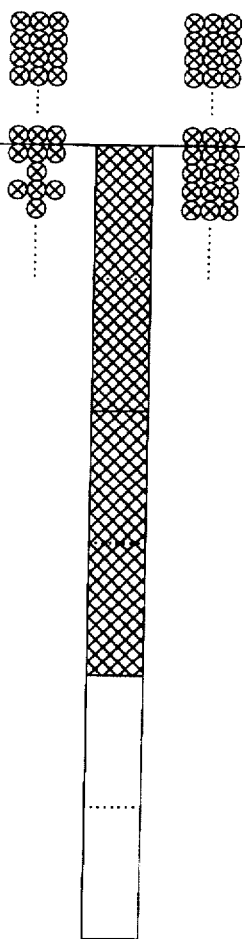

FIG. 16A  FIG. 16B  FIG. 16C  FIG. 16D
   
FIG. 16E  FIG. 16F  FIG. 16G
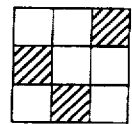 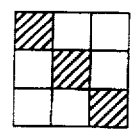 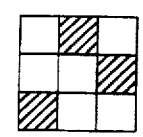

RECORDER AND PRINT CONTROL METHOD USING VARIOUS PRINT PATTERNS TO PRINT PRESCRIBED AREAS BY A PLURALITY OF SCANS

BACKGROUND OF THE INVENTION

The present invention relates to a recorder and a print control method to print every prescribed printing area by a plurality of times of scanning.

A printing method for a recorder is to print an image in a certain area by a plurality of times of divided printing. For example, the printing method disclosed in the Unexamined Japanese Patent Application Publication No. Hei. 3-207665 is to print every two-by-two dots in a checkered pattern at the first scan and then print in the checkered pattern at the second scan so as to fill the parts which were not printed at the first scan. This method prevents, for example, an ink jet printer from uneven print density through reduction in irregular linkage of printed dots. When printing in a plurality of colors, image quality is improved through reduction in color mixture occurred at linkage of adjoining dots.

The recorder disclosed in the Unexamined Japanese Patent Application Publication No. Sho. 60-107975 prints, at the first scan, only odd number lines or even number lines horizontally, or prints every other dot in a checkered pattern, or prints the dots selected at random and then prints at the second scan so as to fill the parts which were not printed at the first time. To consider these printing methods, the method to print odd number lines and even number lines horizontally at different scans is advantageous in that the horizontal straight lines are printed neatly but image quality is degraded by occurrence of horizontal dot linkages when extensive areas are printed. As described above, the checkered-pattern printing method prevents uneven print density and color mixture and thus image quality in extensive areas is improved, but such a trouble as adjoining dots are slightly deviated from each other by each scan may occur in the straight line parts and thus neat straight lines may fail to be printed. Substantial improvement in the image quality cannot be expected from the method to fill dots at random, which has both of these advantages and disadvantages.

In these literatures, the paper feed amount is the half of the head width and, after paper feeding for the areas scanned at the first time by the half of the head, the second scan is performed by the other half of the head. Such print control prevents the joints at the boundary parts of the printing areas from clearly showing.

The recorder disclosed in the Japanese Patent Application No. Hei. 6-55296 prevents color mixture and blur with utilization of the method that the even number lines and the odd number lines are printed by different scans, which is also adopted in the above-described Unexamined Japanese Patent Application Publication No. Sho. 60-107975, only when slow-drying ink is used as the black ink, and the method of checkered-pattern printing or other methods.

The recorder disclosed in the Unexamined Japanese Patent Application Publication No. Sho. 60-9760 controls printing by counting the lines from the top line to the line immediately before presence of graphic data as the number of line feeding times and then starting to print after the line feeding for the counted number of times. This allows increase in the printing speed. This literature, however, does not include any description on image quality improvement through printing of a certain area by a plurality of times of scanning.

SUMMARY OF THE INVENTION

With consideration to the issues described above, the present invention is purposed to provide a recorder and a print control method to improve the image quality of an extensive image area and to improve the image quality of a straight line part as well.

The invention in Aspect 1 is a recorder to print every prescribed printing area by a plurality of times of scanning, which is characterized in the provision of a recording head where a plurality of printing elements are arrayed and a print control unit which controls in such manner that, if the aforenamed printing area is a half or less of the printing width of such recording head, a horizontally or vertically striped pattern is used to print the aforenamed printing area at the top of an image to be printed while a checkered pattern is used to print the aforenamed printing area that follows and thus each of the aforenamed printing areas is printed with use of each of the aforenamed patterns so as to interpolate mutually in a plurality of times of scanning.

The invention in Aspect 2 is the recorder in Aspect 1, which comprises the aforenamed recording head where a color head and a black head are arranged, and which is characterized in that a plurality of printing elements arrayed on the aforenamed color head are divided into printing element groups by each color different from others and that the aforenamed printing area is a half or less of the smallest printing width of each of such groups.

The invention in Aspect 3 is the recorder in Aspect 1 or Aspect 2, which is characterized in the aforenamed print control method in that, if the image to be printed is not present at the position of the aforenamed recording head, a relative transfer of the aforenamed recording head and a recorded medium from such position to a position where the image to be printed is present is performed in advance of printing.

The invention in Aspect 4 is the recorder in any one of Aspect 1 through Aspect 3, which is characterized in the aforenamed print control method that, if the image to be printed is present with extending over a plurality of the aforenamed printing areas, the aforenamed checkered pattern is used to print the aforenamed printing areas that includes the tail of such image.

The invention in Aspect 5 is a print control method to print every prescribed printing area by a plurality of times of scanning, which is characterized in the print control method that, if the aforenamed printing area is a half or less of the printing width capable of printing by one scan, a horizontally or vertically striped pattern is used to print the aforenamed printing area at the top of an image to be printed while a checkered pattern is used to print the aforenamed printing area that follows and thus each of the aforenamed printing area is printed with use of each of the aforenamed patterns so as to interpolate mutually in a plurality of times of scanning.

The invention in Aspect 6 is the print control method in Aspect 5, which uses a recording head consisting of a color head and a black head and the aforenamed color head printing in each color different from others in its own printing width and which is characterized in that the aforenamed printing area is a half or less of the smallest printing width of each of such printing widths.

The invention in Aspect 7 is the print control method in Aspect 5 or Aspect 6, which is characterized in that, if the image to be printed is not present at the position of the recording head, a relative transfer of the aforenamed recording head and a recorded medium from such position to a position where the image to be printed is not present is performed in advance of printing.

The invention in Aspect 8 is the print control method in any one of Aspect 5 through Aspect 7, which is characterized in that, if the image to be printed is present with extending over a plurality of the aforenamed printing areas, the aforenamed checkered pattern is used to print the aforenamed printing areas that include the tail of such image.

According to the invention in Aspects 1 and 5, when a horizontal or vertical line is printed, the print image quality can be improved with the printed dots neatly aligned since a printing area including the top of an image to be printed is printed so as to interpolate mutually in a plurality of times of scanning with use of a horizontally or vertically striped pattern. When an extensive image is printed, a sharp image can be formed with the dots at edge parts neatly aligned. A printing area that follows these is printed so as to interpolate mutually in a plurality of times of scanning with use of a checkered pattern. This improves the image quality of a printed image in the extensive image area. In this way, the image quality not only in the extensive images but also in the linear images can be improved.

Also according to this invention where each printing area is a half or less of the printing width capable of printing by one scan, since the joints of the printing areas are prevented from clearly showing by relatively transferring the head and a record medium at every scan for the amount of each printing area, the image quality can be improved furthermore.

According to the invention in Aspects 2 and 6, realization of the print method in Aspect 1 or 5 through utilization of the color head and the black head as the recording head will successfully prevent such a problem as color mixture in the extensive area and thus provide high-quality color-printed images. If the printing area in this case is reduced to the half or less of the smallest of the printing widths in different colors, the joints at the boundary parts of the different colors are prevented from clearly showing, and thus the image quality can be improved.

According to the invention in Aspects 3 and 7, furthermore, if the image to be printed is not present at the position of the recording head, the relative transfer of the recording head and the record medium from that position to the position where the image to be printed is present is performed in advance of printing will reduce unnecessary scans and thus the entire printing speed can be increased.

According to the invention in Aspects 4 and 8, if the image to be printed is extensive and present over a plurality of printing areas, the aforenamed checkered pattern is used to print the printing areas that includes the tail of such image and thus print control at the tail of the image can be simplified.

BRIEF DESCRIPTION OF THE DRAWINGS

FIG. 3 is a block diagram to show an embodiment of the control system to realize the print control method according to the present invention.

FIGS. 4A to 4D are illustrations to show some examples of the patterns used for print control.

FIGS. 13A to 13C illustrate the third concrete example of the printing dots in the operational embodiment according to the present invention.

FIGS. 15A to 15F illustrate the example for explanation of another embodiment of the print control method according to the present invention.

FIGS. 16A to 16G show other sample patterns used for the print control.

DETAILED DESCRIPTION OF THE PREFERRED EMBODIMENTS

Figure 1:
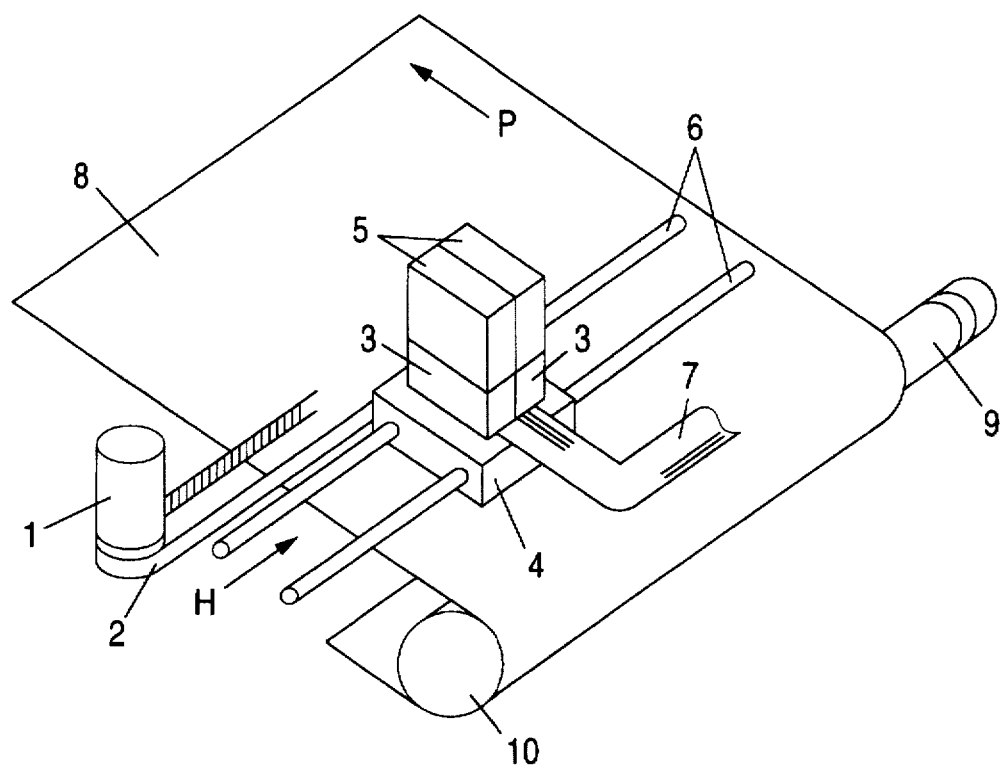
FIG. 1 is a simplified configurative drawing to show an embodiment of the recorder where the print control method according to the present invention is applied.

FIG. 1 is a simplified configurative drawing to show an embodiment of the recorder where the print control method according to the present invention is applied. FIG. 1 shows a carriage drive motor 1, a timing belt 2, recording heads 3, a carriage 4, ink tanks 5, carriage guides 6, a cable 7, recording paper 8, a paper feed motor 9 and a feed roller 10. As an embodiment of the recorder, an ink jet type recorder is shown here. In the following paragraphs, the description proceeds on the premise that the ink jet type is used.

The recording heads 3 are mounted on the carriage 4 which, sliding along the carriage guides 6, travels in a reciprocating action in the horizontal scanning direction indicated with an arrow $\underline{H}$ in the figure. The travel of the carriage 4 is operated by the timing belt 2 which is driven by the carriage drive motor 1. The two recording heads 3 are arrayed in the travelling direction of the carriage 4 in this embodiment. One is for recording in black, and the other for recording in a plurality of colors other than black, such as cyan, magenta and yellow. The cable 7 is lead into the recording heads 3 for such purposes as power supply for a heater inside the recording heads 3 and signal transmission to a drive circuit. The ink tanks 5 which are attached respectively to the recording heads 3 supply ink of different colors. A plurality of nozzles are provided on each of the recording heads 3, and supplied ink jets out of the nozzles to record on the recording paper 8. The recording paper 8 is driven in the direction indicated with an arrow $\underline{P}$ in the figure by the feed roll 10 which is rotatively driven by the paper feed motor 9 to scan vertically.

Figure 2:
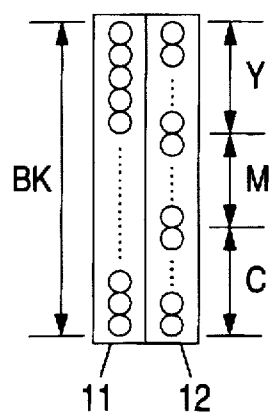
FIG. 2 is a simplified drawing to show an embodiment of the recording head which is utilized for the print control method according to the present invention.
Figure 5:
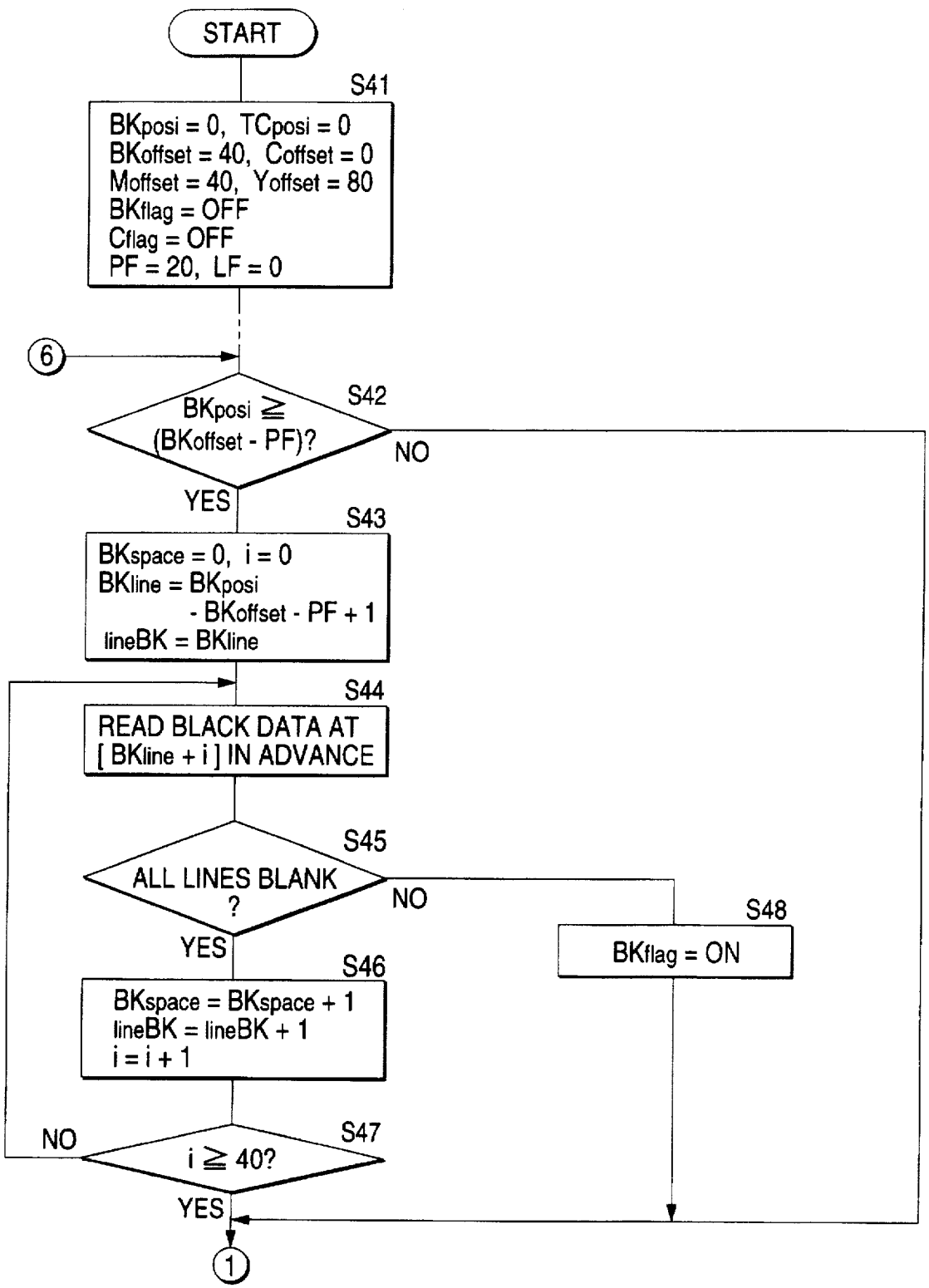
FIG. 5 is a flowchart to show an example of the operations of an embodiment of the print control method according to the present invention.
Figure 6:
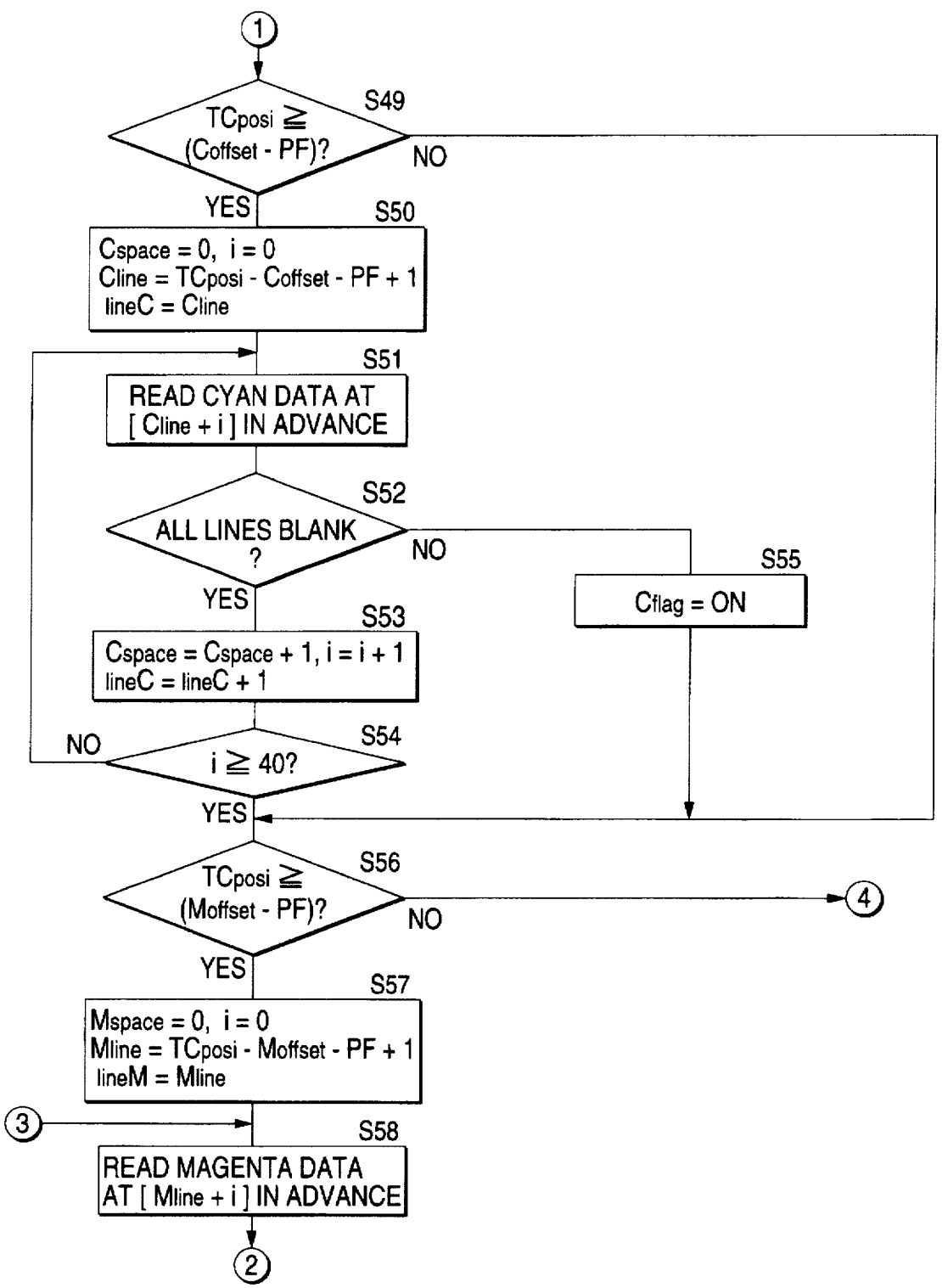
FIG. 6 is a flowchart (continuing) to show an example of the operations of an embodiment of the print control method according to the present invention.
Figure 7:
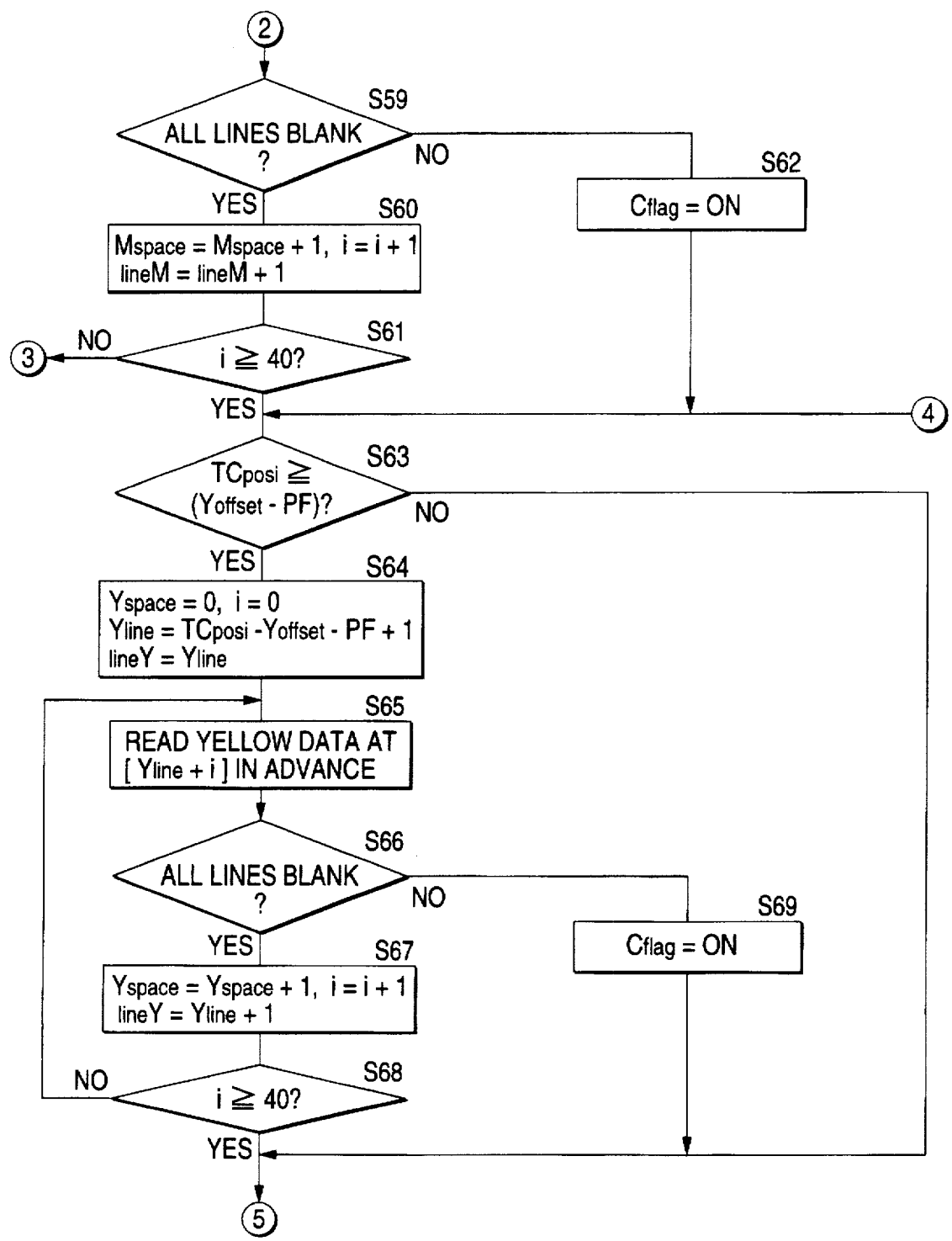
FIG. 7 is a flowchart (continuing) to show an example of the operations of an embodiment of the print control method according to the present invention.
Figure 8:
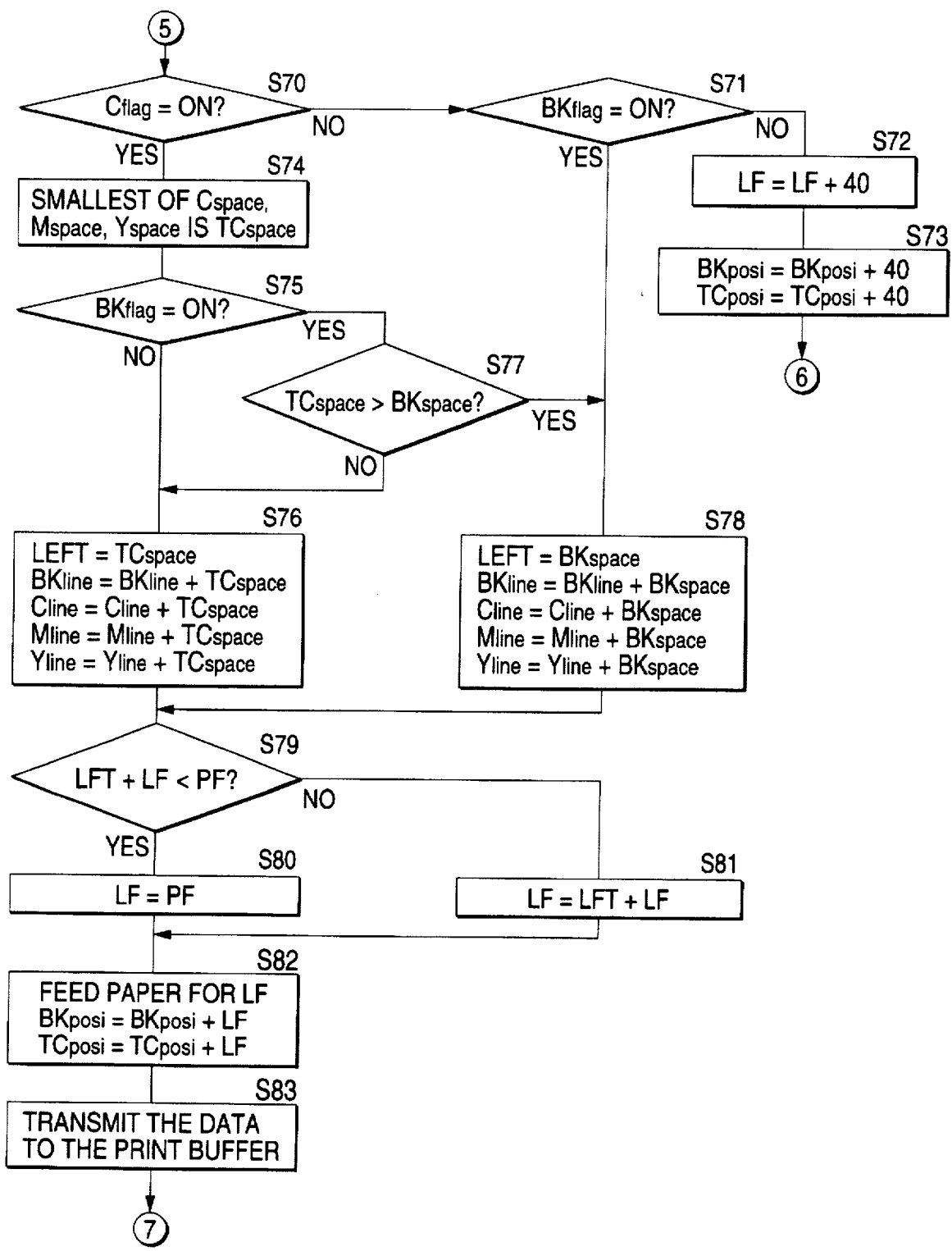
FIG. 8 is a flowchart (continuing) to show an example of the operations of an embodiment of the print control method according to the present invention.
Figure 9:
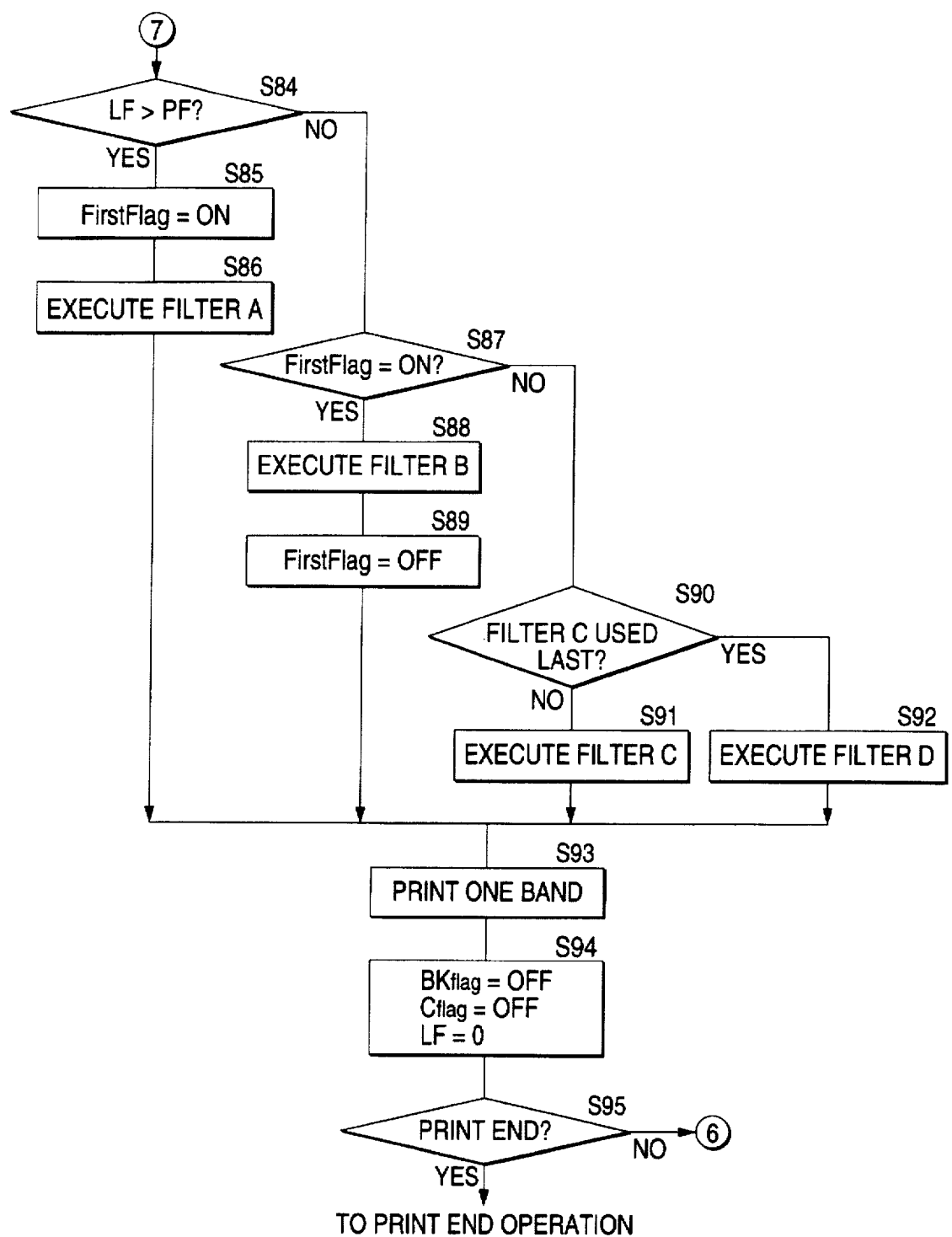
FIG. 9 is a flowchart (continuing) to show an example of the operations of an embodiment of the print control method according to the present invention.

FIG. 2 is a simplified drawing to show an embodiment of the recording head which is utilized for the print control method according to the present invention. The figure shows a black recording head 11 and a color recording head 12. In the ink jet type, for example, the nozzles are arrayed in vertical lines as in the figure on each of the recording heads. The black recording head 11 prints with all or some of the arrayed nozzles.

The arrayed nozzles on the color recording head 12 are grouped according to the number of colors in use. Ink of three colors, cyan, magenta and yellow are used here, and the nozzles to jet out ink of respective colors are arrayed in straight lines. In the figure, BK stands for black, C for cyan, M for magenta and Y for yellow. All the nozzles provided on the color recording head 12 may be divided into these groups or some nozzles may be left unused. It is possible to prevent color mixture on the nozzle surface or the like by a configuration where the unused nozzles are located between the groups. The order of color location may be changed as appropriate and the color of ink and the number of colors may be changed as well.

FIG. 3 is a block diagram to show an embodiment of the control system to realize the print control method according to the present invention. The figure shows a CPU 21, an interface driver 22, a ROM 23, a RAM 24, motor drivers 25 and 26, a print timing generation circuit 27, a sensor unit 28, a control panel 29, a head driver 30, a host device 31, a carriage motor 32, a paper feed motor 33 and a head 34. The CPU 21 performs the control of the recorder parts through utilization of the RAM 24 according to such as the control procedure and data stored in the ROM 23 or the data detected by the sensor unit 28 which includes a paper detection sensor. The CPU 21 which is connected to the host device 31 such as a computer via the interface 22 also performs the storing of recording data transmitted from the host device 31, such as image data, in the RAM 24 and the control of recording operations during the decoding of the command signals, such as a command from the host device 31, and the recording information signals. The RAM 24, having the operational area of the CPU 21, functions also as a image memory where the image data which should be recorded respectively for each color is developed in dots and stored. According to the instructions from the CPU 21, the motor drivers 25 and 26 and the head driver 30 respectively control the carriage motor 32, the paper feed motor 33 and the head 34. The print timing generation circuit 27 generates and supplies to the head driver 30 timing signals for jetting ink out of the head 34 according to the instructions from the CPU 21. The sensor unit 28 detects and transmits to the CPU 21 such as temperatures, ink amounts, paper presence and so on of the parts of the printer. The control panel displays the state of the recorder and the users inputs their instructions here.

FIG. 4 is an illustration showing some examples of the patterns used for print control. The print control method described below prints 100% by performing 50% print scan twice. The printing which utilizes the mutually interpolating patterns shown in FIGS. 4A and 4B and the printing which utilizes the mutually interpolating patterns shown in FIGS. 4C and 4D are selectively used here. The patterns shown in FIGS. 4A and 4B are used to print the horizontally-aligned dots by one scan and the horizontal lines are neatly printed with these patterns. The patterns shown in FIGS. 4C and 4D can reduce uneven print density and color mixture through reduction in linked dots.

Since the width of a horizontal line is normally narrower than the width of one printing area, the print control is performed here in such a manner that the printing area at the top of an image, i.e., the printing area in which the first scanned line is located, to be printed is printed with use of the patterns shown in FIGS. 4A and 4B so that the horizontal line can be neatly printed. In this case, even if an image to be printed is present with extending over a plurality of printing areas, so long as the edge part at the top is horizontal, the edge can be printed neatly. In the case where the image to be printed is present with extending over a plurality of printing areas, the patterns shown in FIGS. 4C and 4D are utilized to print the printing areas other than the top, including the area in which the last scanned line is located, i.e., the tail of the image. The internal area of the extensive image to be printed can be printed without uneven density and color mixture.

The following paragraphs describe an embodiment of the print control method according to the present invention. In the following description, the black head 11 and the color head 12 arranged to adjoin each other as in FIG. 2 constitute the recording head in use, and the constitution allows the color head 12 to print in three colors, cyan, magenta and yellow in this order by the dots respectively of the same number. The head and the record medium are relatively transferred by every half of the printing width of each color while printing. The black head 12 prints in the areas where the color head 12 prints in magenta. The present position shows the bottom of the recording area of each color including black.

The following outlines the printing sequence. Firstly, the number of the lines which are not printed are determined. Starting from the line one recording width in front of the present position of each color, the number of consecutive lines which are not printed is determined by each width of the print head. This is performed for data of every color. The smallest value of the numbers of the lines which are not printed obtained for each color is determined. The record medium and the head are relatively transferred so as to skip this smallest value, that is line feeding is performed. Here the number of skipped lines is added to the address and each line to read the image data is determined. From the determined line of reading for each color, the image data for the head width is transmitted to a print buffer.

The Image data transmitted to the buffer is filter-processed with a dot patter prescribed for each color and then transmitted to the head to print. At this time, if the printing range (two printing areas)of each color does not overlap the printing range at the previous scan, the pattern is determined by assumption that all is the first pass as for the concerned scan of each color. For example, as for the top of the record medium or the image data after the line feed amount exceeds the recording area width, any one color is always the first pass. When any one color is the first pass, the other colors are always the first pass as well. If no image data to be printed for the remaining colors at this moment is present and, for example, even if the image data to be printed is present for the first time at the next scan, the next scan cannot be the first pass. When the line feed amount is within the recording area width, the printing range of the concerned scan overlaps the printing range of the previous scan, and thus the concerned scan cannot be the first pass.

In the case for the first pass, filter processing is performed with the pattern shown in FIG. 4A, for example, and, at the second scan, filter processing is performed with the pattern shown in FIG. 4B, for example. At the scans other than the first pass, filter processing may be performed with alternate use of the patterns shown in FIGS. 4C and 4D.

Repetition of such processing allows to print by the scanning of each recording area twice while performing the skipping of the lines which are not printed, the filter processing where the scan after the skipping is the first pass and the filter processing where the subsequent scans are any but the first pass.

FIGS. 5 through 9 are the flowcharts to show an example of the operations of an embodiment of the print control method according to the present invention. In this concrete example, the print width of the black head 11 performs the 40-dot printing in the same area as magenta. The print width of each color of the color head 12 is forty dots and arrayed in the order of cyan, magenta and yellow. Variables BKposi and TCposi respectively indicate the present positions of the black head 11 and the color head 12. A constant BKoffset is the number of dots from the end of the nozzles used for printing by the black head 11 to the variable BKposi, and constants Coffset, Moffset and Yoffset are respectively the numbers of dots from the nozzle end of each color of the color head 12 to the variable TCposi. A constant PF is the value which indicates a normal line feed amount indicates the half of the printing width of a single color of the color head 12. A variable LF indicates an actual line feed amount.

At S41, initialization is carried out. Later at S42, the present position of the black head BKposi is confirmed to be larger than [BKoffset−PF] but, if it is not so, the sequence proceeds to S49. This judgement is purposed to prohibit the following processing steps if black image data is not present at the top of the record medium.

At S43, a counter BKspace of blank lines of black is set to 0 and a reference line BKline of the black data is set to [BKline−BKoffset−PF+1]. This sets back the reference line BKline by the recording area width PF from the present position so as to allow the detection of the image data which is complete with the first scan but before the second scan. Additionally, a loop counter i is set to 0 and BKline is substituted in a variable lineBK which indicates the top line of the black data to be printed.

At S44, the black data at the line [BKline+i] is read in advance and, at S45, all are judged to be blank, or that there is no data to be printed. At S46, a counter BKspace, the loop counter i and the variable lineBK are counted up, if all is blank, and then, after whether forty lines are referenced or not is judged at S47, the sequence returns to S44 to repeat the steps.

If a line which is not blank is detected at S45, a flag BKflag which indicates that a line which is not blank has been found is set to ON at S48, the sequence proceeds to S49 getting out of the loop. On completion of the reference of the forty lines at S47, the sequence also proceeds to S49. This case means that all of the forty lines were blank.

Nextly, the processing similar to the processing for the color black is carried out for the color cyan. At S49, the present position of the color head TCposi is confirmed to be larger than [Coffset−PF], and if it is not so, the sequence proceeds to S56. At S50, a counter Cspace of blank lines of cyan is set to 0 and a reference line Cline of cyan data is set to [Cposi−Coffset−PF+1] while lineC which is the top line of the cyan data to be printed is set to Cline and additionally the loop counter i is set to 0. At S51, the cyan data at the line [Cline+i] is read in advance and, at S52, all are judged to be blank or not. If all is blank, at S53, a counter Cspace, the variable lineC and the loop counter i are counted up and then, after whether forty lines are referenced or not is judged at S54, the sequence returns to S52 to repeat the steps.

If a line which is not blank is detected at S52, a flag Cflag which indicates that a line which is not blank has been found is set to ON at S55, the sequence proceeds to S56 getting out of the loop. On completion of the reference of the forty lines at S54, the sequence also proceeds to S56.

At steps S56 through S62, the processing similar to the processing S49 through S55 for the color cyan is carried out for the color magenta. Here a reference line Mline of magenta data is set to [Mposi−Moffset−PF+1]. Furthermore, at steps S63 through S69, the processing similar to the processing for the color magenta is carried out for the color yellow. Here a reference line Yline of yellow data is set to [Yposi−Yoffset−PF+1].

In this way, both the upper and lower twenty lines from the bottom of each color, that is, two recording areas, are referenced. Then, the number of blank lines are counted and the top line of the image data to be printed is updated while, if there is a line which is not blank is present, Cflag and BKflag are set to ON.

At S70, Cflag is judged to be ON or not and, if it is not ON, BKflag is judged to be ON or not at S71. The case BKflag is not ON either indicates absence of color data and black data. Since this means possibility of further line feeding of substantial quantity, the line feed amount LF is increased by forty dots at S72 and, after the present head positions BKposi and TCposi are updated at 73, the sequence returns to S42 to count any other blank lines.

The case where Cflag is ON at S70 means presence of the data to be printed in any forty lines of the colors, cyan, magenta and yellow, the smallest counted value of Cspace, Mspace and Ysapce is selected as TCspace at S74. Further at S75, BKflag is judged to be ON or not. The case where BKflag is not ON means detection of the color data only. At S76, a temporary variable LFT is set to TCspace, and TCspace is respectively added to BKline, Cline, Mline and Yline.

The case where BKflag is ON at S75 means detection of both the black data and the color data. At S77, the smallest number of blank lines TCspace which is detected from the color data and the number of blank lines BKspace which is detected from the black data are compared and, if TCspace is the smaller, this is adopted and settings with utilization of TCspace are made at S76. If BKspace is the smaller, the temporary variable LFT is set to BKspace at S78 so that BKspace is respectively added to BKline, Cline, Mline and Yline.

Since the case where BKflag is ON at S71 means detection of the black data only, the sequence proceeds to S78 where settings with utilization of the number of blank lines of the black data BKspace are made.

After resetting of the temporary variable LFT and the reference lines in this way at S76 or S78, the sum of the temporary variable LFT and the line feed amount LF is judged if smaller than PF at S79. If it is smaller than PF, actual line feed amount LF is set for PF at S80. If it is equal to or larger than PF, the actual line feed amount LF is set as [LFT +LF] at S81. Line feed amount settings in this way allow continuous scanning through line feeding by every PF dots in case of presence of any area to be printed by normal continuous scanning or by spacing of less than PF dots and to transfer the head to the next area to be printed so as to perform the first scan in case of presence of a space not less than PF dots.

At S82, relative transfer of the single recording unit and the head actually for the line feed amount LF, and the present positions BKposi and TCposi are updated. Nextly at S83, the image data is transmitted to the print buffer.

Figure 10:
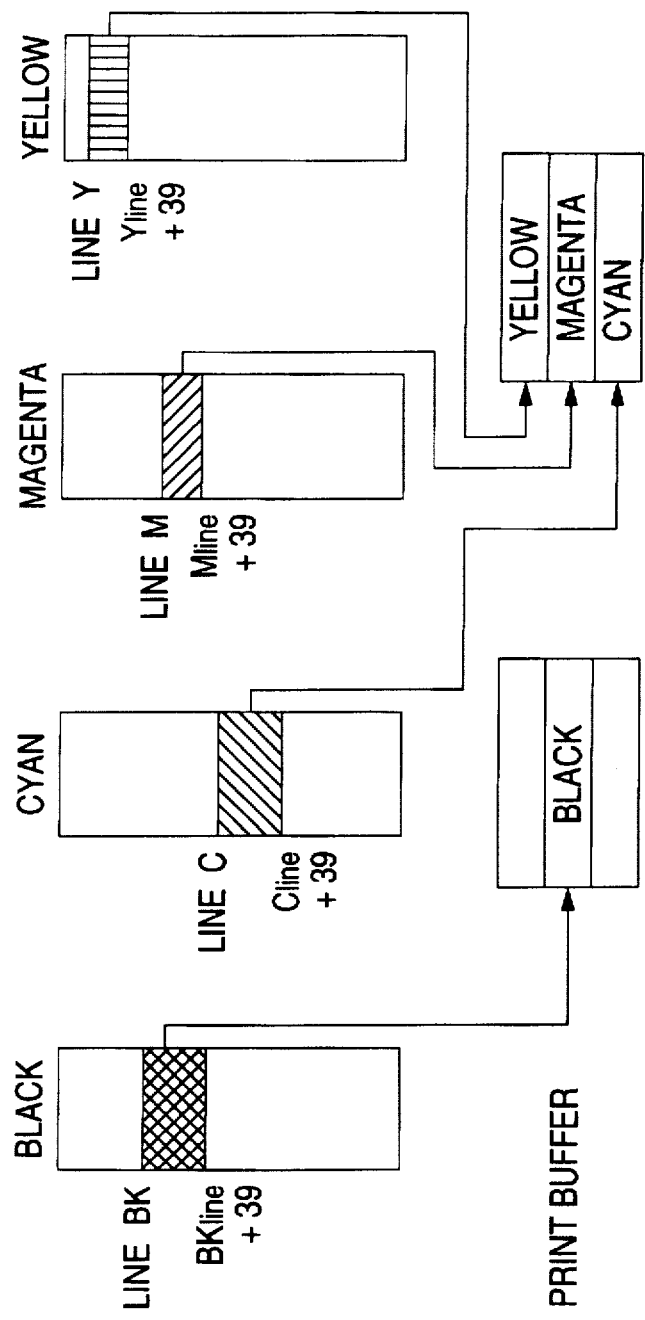
FIG. 10 illustrates an embodiment of the image data transmission to the print buffer.

FIG. 10 illustrates an embodiment of image data transmission to the print buffer. The areas to be printed by the present scan are from BKline to [BKline+39] for the black data, from Cline to [Cline+39) for the cyan data, from Mline to [Mline+39] for the magenta data and from Yline to [Yline+39] for the yellow data. In the previous processing, the variables lineBK, lineC, lineM and lineY store the top lines of the image data to be printed excluding blank lines. Therefore, if the print buffer is cleared, the data transmission is not needed in the blank lines, and thus the transmission time can be reduced through transmission of only the required parts.

According to this aspect, this embodiment as in FIG. 10 has a configuration where the image data from lineBK to [BKline+39] for the black data, from lineC to [Cline+39] for the cyan data, from line to [Mline+39] for the magenta data and from lineY to [Yline+39] for the yellow data is transmitted from image memories of respective colors to the print buffer. If lineBK, lineC, lineM and lineY are respectively larger than [BKline+39], [Cline+39], [Mline+39] and [Yline+39], the image data is not transmitted to the print buffer.

Since BKline, Cline, Mline and Yline are calculated on the basis of the respective offset amounts, BKoffset, Coffset, Moffset and Yoffset while lineBK, lineC, lineM and lineY are set on the basis of BKline, Cline, Mline, Yline and the space amounts, only the image data to be printed that fit each printing area is transmitted.

As in FIGS. 5 through 9 again, after the image data transmission to the print buffer, the line feed amount LF is judged to be larger than PF or not at S84. If it is larger than PF, the next scan becomes the first printing of the first pass. For this reason, at S85, a flag FirstFlag which indicates being the first pass is set to ON and, at S86, the pattern shown in FIG. 4A, for example, is selected for a filter A to be used in the first printing of the first pass.

If the line feed amount LF is not larger than PF, the flag First Flag is referenced further at S87 and judges if it is ON or not. If this flag is ON, the second printing of the first pass is included. For this purpose, at S88, a filter B is selected for the upper half of each color to interpolate the first printing of the first pass. For example, a pattern such as shown in FIG. 4B is seleIcted. Since the lower half is not the first pass, a pattern such as shown in FIG. 4C is selected. At S89, the flag FirstFlag is set to OFF to indicate the completion of the first pass.

If the line feed amount LF is not larger than PF and the flag FirstFlag is OFF, any pattern other than the first pass is selected. At S90, the filter used previously is judged to be a filter C or not and, if the filter C was used previously, a filter D which is mutually interpolating with that is selected at S92 but, if it is not the filter C but the filter D that was used previously, the filter C is selected at S91. As the patterns of the filters C and D, the patterns in FIGS. 4C and 4D may be utilized.

At S93, the filter processing is performed with utilization of the filter patterns selected in this way to supply to the heads, and after the first printing scan the printing is performed in respective colors. At S94, BKflag and Cflag are set to OFF and the line feed amount LF is reset to 0.

At S95, whether printing of the image to be printed is completed or not is judged and, if it is not completed, the sequence returns to S42 to continue the print processing. On completion of printing, the print end operation is performed.

In this way, while the printing is performed with two scans where the principle is the line feeding of the half of the printing area of each color, the skip of the lines which are not printed, the filter processing where the scan after the skip is the first pass, and the filter processing where the succeeding scans are excluded from the first pass are performed to realize provision of high quality images at high speeds.

Not being confined to the above-described operational embodiment which reduces the amount of the image data transmitted to the print buffer with utilization of the variables lineBK, lineC, lineM and lineY, another constitution where any data respectively from BKline, Cline, Mline and Yline to [BKline +39], [Cline +39], [Mline +39] and [Yline +39] is transmitted regardless of presence or absence of the image data to be printed is also available.

Not being confined to the above-described embodiment which controls so that the black head will print the forty dots in the same position as magenta, nozzles in the position of cyan or yellow may be utilized for printing.

Regarding the above-described operational embodiment, there is a case where actual line feeding is available only in every several lines due to the performance of the driving system. In such a case, with consideration of the number of lines possible of line feeding, a number to the line which is the nearest to the image data to be printed and is possible of line feeding may be established as the actual line feed amount.

For prevention of mixture of the colors adjoining each other on the color head of the ink jet type, a technique has been developed to prevent the color mixture where some space of a plurality of dots (dummy nozzles) is provided along each border of colors. In the case where such dummy nozzles are provided, the above-described controls should be considered for operation.

Figure 11A:
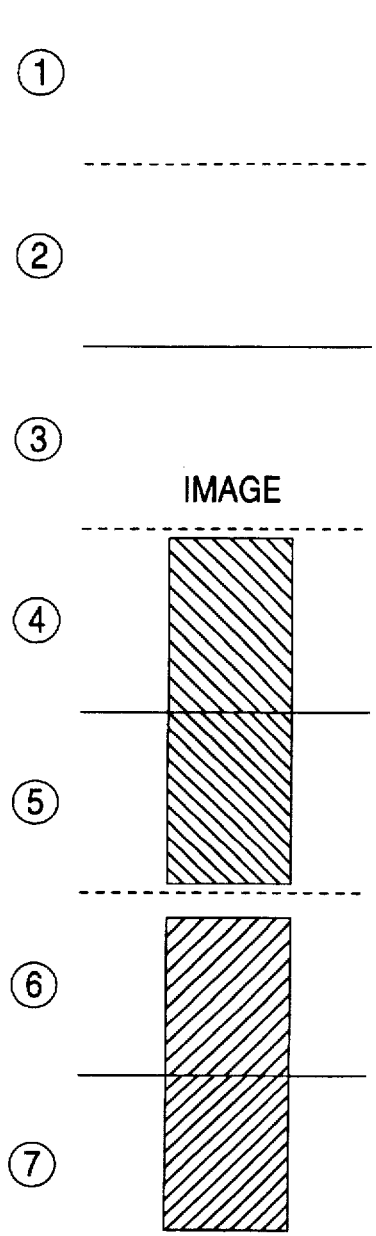
FIGS. 11A to 11C illustrate the first concrete example of the printing dots in the operational embodiment according to the present invention.

The following paragraphs describe an embodiment of the above-described operations with utilization of concrete examples. FIG. 11 illustrates the first concrete example of the printing dots in the operational embodiment according to the present invention. This concrete example, as in FIG. 11A, shows the case where extensive areas are printed in magenta and cyan. Solid lines show the printable areas of respective colors and the dotted lines designates the two recording areas inside the printable areas. Magenta which is indicated for convenience of illustration with hatching tilted to the left prints in the areas (4) and (5). Cyan which is indicated also for convenience of illustration with hatching tilted to the right prints in the areas (6) and those following area (6). The white dots show the print pattern where there is no image data to be printed. The record medium relatively transfers from the bottom toward the top in the figure while the head relatively transfers from the top toward the bottom in the figure. This is the same in the concrete examples described below.

Figure 11B:
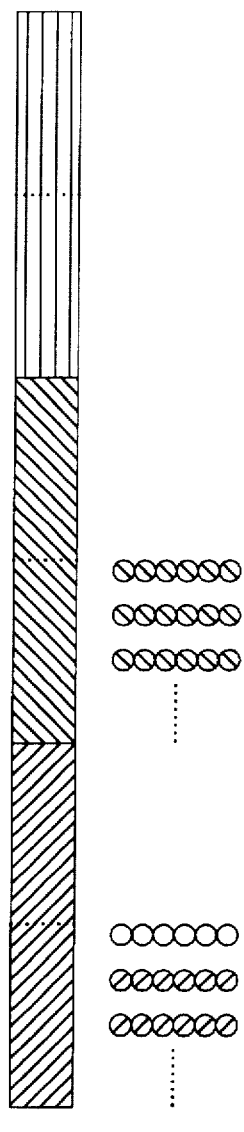

When line feeding is performed according to the flowcharts described above, the color head is aligned at the position indicated in FIG. 11B. In this case, since the flag Cflag is set to ON while the flag Bflag is set to OFF, the minimum value is Mspace and thus the line feeding is performed at S82 via steps S70, S74, S75, S76, S79 and S81. After the image data transmission to the print buffer at S83, the filter A is selected at S86 and the first pass is printed at S93. In this case, since the image data to be printed exists in both cyan and magenta, the pattern shown in FIG. 4A, for example, is utilized to perform filter processing for the first printing of the first pass, and a 50%-printing is performed in cyan and magenta with a single-spacing pattern. The first printing of the first pass is thus performed in the recording areas (4) and (6).

Figure 11C:
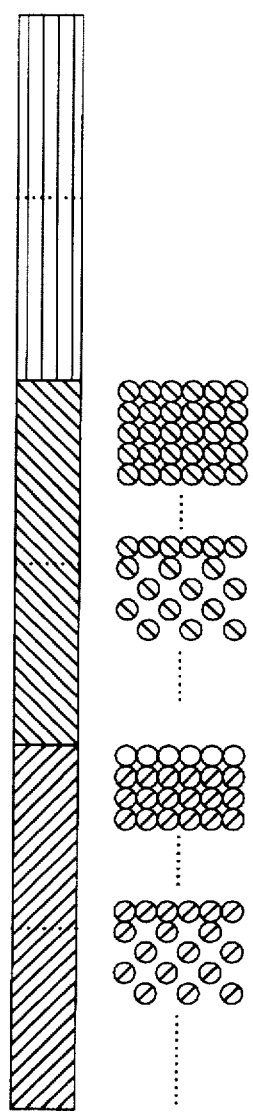

Nextly, the record medium is relatively transferred only by the recording area width as shown in FIG. 11C and the second printing of the first pass is performed. In this case, since the first printing of the first pass has already been performed, the flag FirstFlag is set to ON. For this reason, the sequence proceeds from S87 to S88 and, in the printing areas where the first printing in cyan and magenta is performed, the processing of the filter B is performed with utilization of a pattern which interpolates the pattern used in the first printing, such as the pattern in FIG. 4B. In the areas adjoining those, since this is not the first pass, the processing of the filter C is performed with utilization of a pattern, such as indicated in FIG. 4C. This print scan completes a 100%-printing in the printing areas (4) and (6) and, in the printing areas (5) and (7), the 50%-printing is performed with a checkered pattern. Following this, in the printing areas (5) and (7), the processing of the filter D is performed with utilization of an interpolating pattern, such as indicated in FIG. 4D at the third print scan to complete the 100%-printing.

Figures 12A, 12B, 12C, 12D:
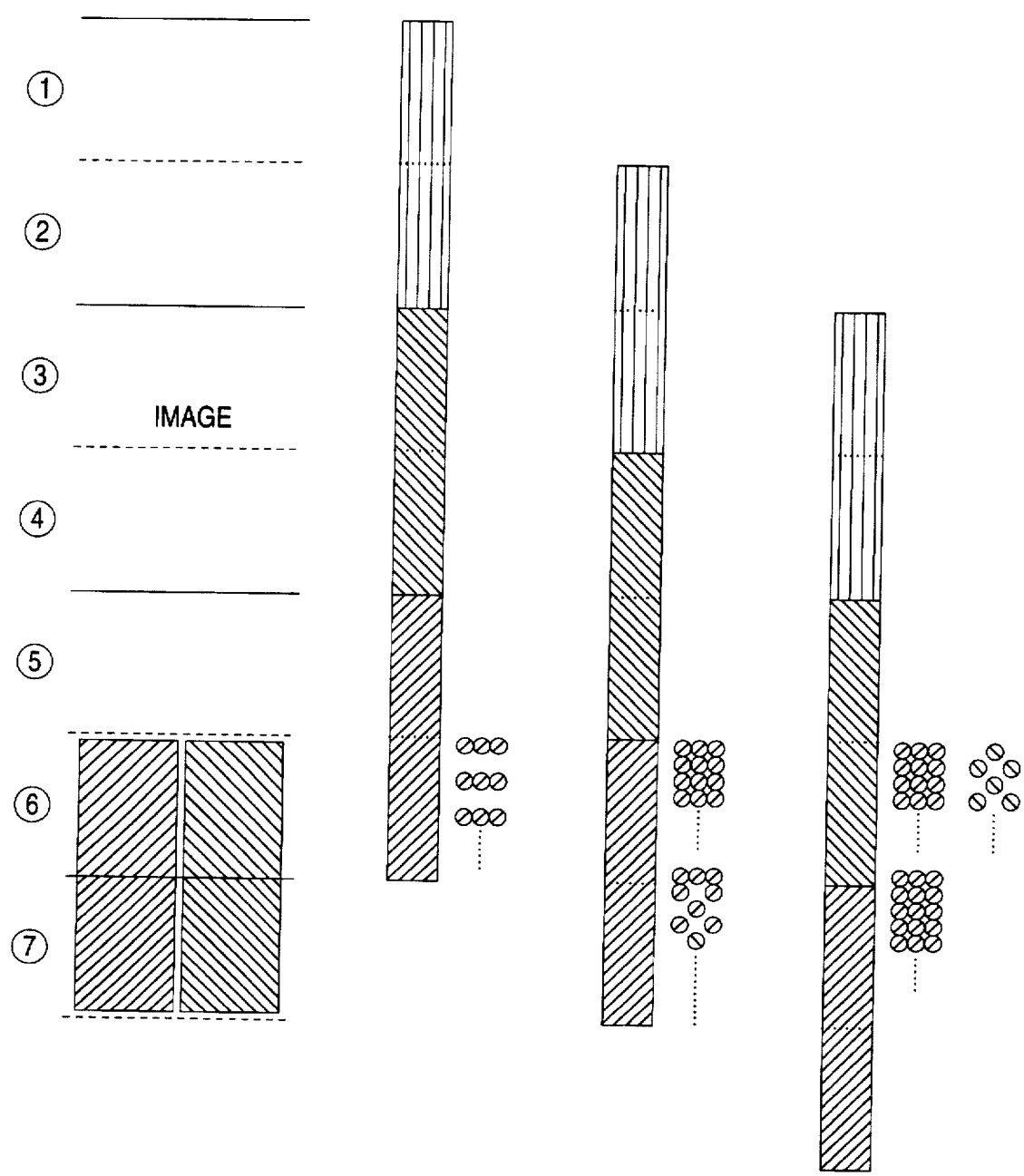
FIGS. 12A to 12D illustrate the second concrete example of the printing dots in the operational embodiment according to the present invention.

FIG. 12 illustrates the second concrete example of the printing dots in the operational embodiment according to the present invention. This concrete example, as in FIG. 12A, shows the case where the same recording areas (6) and (7) are printed in magenta and cyan. Solid lines show the printable areas of respective colors and the dotted lines show the two recording areas inside the printable areas. Magenta is indicated with hatching tilted to the left and cyan is indicated with hatching tilted to the right.

Line feeding is performed in the same way as the above-described first concrete example, and the color head is aligned at the position indicated in FIG. 12B. After the image data transmission to the print buffer at S83 in the above-described flowchart, the filter A is selected at S86 and the first pass is printed at S93. In this case, since the image data to be printed exists in cyan only. For this reason, the pattern shown in FIG. 4A, for example, is utilized to perform filter processing for the first printing of the first pass, and the 50%-printing is performed in cyan with a single-spacing pattern.

Nextly, the record medium is relatively transferred only by the recording area width as shown in FIG. 12C and the second printing of the first pass is performed. In this case, the sequence proceeds from S87 to S88 and, in the printing area where the first printing in cyan has already been performed, the processing of the filter B is performed with utilization of a pattern which interpolates the pattern used in the first printing, such as the pattern in FIG. 4B. Since the cyan part of the printing area (7) which adjoin that is not the first pass, the processing of the filter C is performed with utilization of a pattern, such as indicated in FIG. 4C. This print scan completes the 100%-printing in the printing area (6). In the cyan part of the printing area (7), the 50%printing is performed with a checkered pattern.

Nextly, the record medium is relatively transferred only by the recording area width as shown in FIG. 12D and the third print scan is performed. In the third print scan, printing is performed in the cyan part of the printing area (7) with utilization of a pattern which interpolates the pattern used in the second printing. Simultaneously, printing is performed in a magenta part of the printing area (6). The magenta part of the image pattern which is printed for the first time in this case is not the first pass since the printing of a continuous cyan image patter is in progress. That is, in the above-described flowchart, the sequence, having proceeded from S84 to S87 where the flag FirstFlag is set to OFF, now proceeds to S90. For example, if the processing of the filter C has been performed in the second print scan, the processing of the filter D is performed in the third print scan with utilization of a pattern, such as indicated in FIG. 4D. In this case, filters of the same pattern can be used for cyan and magenta. After this, in the magenta part of the printing area (6), the processing of the filter C is performed in the fourth print scan with utilization of an interpolating pattern, such as indicated in FIG. 4C.

FIG. 13 illustrates the third concrete example of the printing dots in the operational embodiment according to the present invention. This concrete example, as in FIG. 13A, shows the case where extensive areas are printed in black and magenta, and the black area is located lower than the magenta area. Black which is indicated for convenience of illustration with cross hatching extends over the recording areas (4) through (6). Magenta records in the recording areas (4) and (5).

In this case, both the flags Cflag and BKflag are set to ON and the sequence proceeds to S77 but; since Msapce is smaller than BKspace, the sequence proceeds to S76, where such as resetting of the reference line based on Mspace is performed and then line feeding is performed at S82. After the image data transmission to the print buffer at S83, the filter A is selected at S86 and the first pass is printed at S93. In this case, as for black and magenta, the pattern shown in FIG. 4A, for example, is utilized to perform filter processing for the first printing of the first pass, and a 50%-printing is performed in black and magenta with a single-spacing pattern. The first printing of the first pass of black and magenta is thus performed in the recording area (4).

Nextly, the record medium is relatively transferred only by the recording area width as shown in FIG. 13C and the second printing of the first pass is performed. In this case, since the first printing of the first pass has already been performed, the flag FirstFlag is set to ON. For this reason, the sequence proceeds from S87 to S88 and, in the printing area (4) where the first printing in black and magenta has been performed, the processing of the filter B is performed with utilization of a pattern which interpolates the pattern used in the first printing, such as the pattern in FIG. 4B. The print scan completes the 100%-printing in the printing area (4) and, in the printing area (5), the 50%-printing is performed with a checkered pattern. Following this, in the printing area (5), the processing of the filter D is performed with utilization of an interpolating pattern, such as indicated in FIG. 4D at the third print scan to complete the 100%-printing. Simultaneously in the printing area (6), the processing of the filter D is performed and the 50%-printing is performed in black and finally the processing of the filter C is performed in the printing area (6) at the fourth print scan to complete the 100%-printing.

Figures 14A, 14B, 14C:
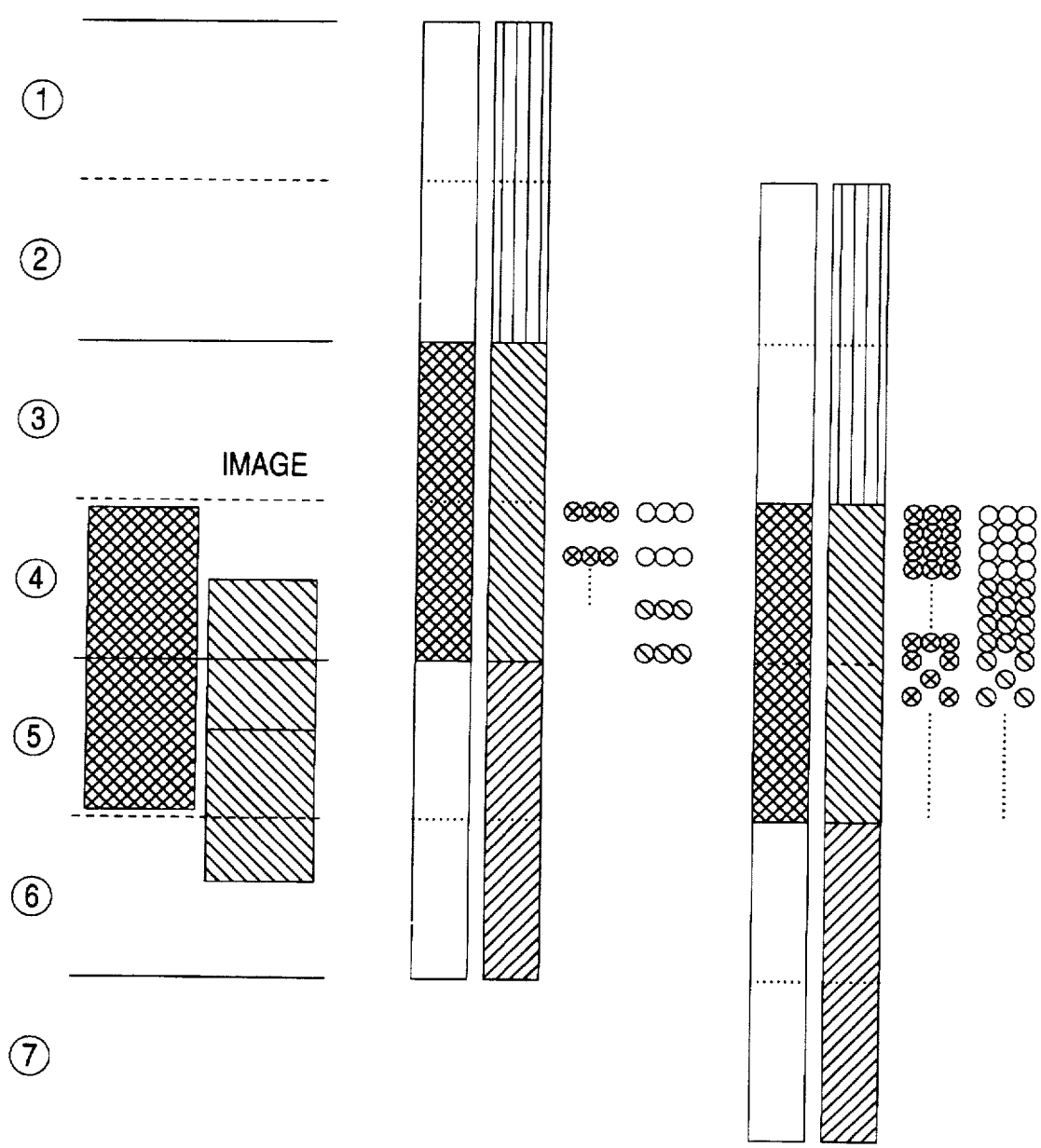
FIGS. 14A to 14C illustrate the fourth concrete example of the printing dots in the operational embodiment according to the present invention.

FIG. 14 illustrates the fourth concrete example of the printing dots in the operational embodiment according to the present invention. This concrete example resembles the example shown in FIG. 13, but as shown in FIG. 14A, the black area is located higher than the magenta area.

In this case, both the flags Cflag and BKflag are set to ON and the sequence proceeds to S77 but; since Msapce is larger than BKspace, the sequence proceeds to S78. Such as resetting of the reference line based on BKspace is performed here and then line feeding is performed at S82. After the image data transmission to the print buffer at S83, the filter A is selected at S86 and the first pass is printed at S93. The further processing is similar to the above-described third concrete example.

The above-described embodiment prints each recording area by two scans. The present invention, however, is not confined to that but control of printing by more than a few times of scanning is also available. FIG. 15 illustrates an example for explanation of another embodiment of the print control method according to the present invention and FIG. 16 shows other sample patterns used for the print control. FIG. 15 shows an example where printing is performed by four scans when the black data is printed by the black head.

The first pass, however, is printed by two scans as in the above-described method.

A case of printing the image data extending over the recording areas (4) through (6) as in FIG. 15A is considered. In the same way as the above-described concrete examples, line feeding is performed so that the head is positioned as FIG. 15B and the first printing of the first pass is performed for the recording area (4).

Nextly, line feeding is performed only for the recording area width and the head is positioned as FIG. 15C. The second printing of the first pass is performed with the second scan, and the 100%-printing is completed in the recording area (4). Since the recording area (5) is not the first pass, the first 25%-printing is performed with utilization of the pattern shown in FIG. 16A, for example.

Nextly, line feeding for the recording area width is performed and the head is positioned as FIG. 15D. At the third scan, the filter processing with a filter pattern different from the one utilized at the second scan, such as indicated in FIG. 16B, is performed to print. This effects another 25%-printing in the recording area (5), which completes the 50%-printing. A 25%-printing is performed in the recording area (6).

Further at the fourth scan, the head is positioned at FIG. 15E. Printing is performed with utilization of a filter, such as indicated in FIG. 16C to complete the 75%-printing in the recording area (5) and the 50%-printing in the recording area (6). Further at the fifth scan, the head is positioned at FIG. 15F. Printing is performed with utilization of a filter, such as indicated in FIG. 16D to complete the 100%-printing in the recording area (5) and the 75%-printing in the recording area (6). Further at the sixth scan, printing is performed with utilization of a filter, such as indicated in FIG. 16A to complete the 100%-printing in the recording area (6).

By this method of printing by four scans can reduce uneven print density caused by dot linkage, particularly in the ink jet recorder. This is effectively especially in the case where slow-drying ink is used as the black ink to improve the color formation.

Although the above described embodiment prints twice for the first pass, another constitution where the first pass is printed in four times is also possible. Furthermore, such four-time printing method as utilized for black may be applied for other colors, and such combination as two-time printing in other colors while only black is printed four times to finish is possible. This case is feasible through some modifications in the flowcharts shown in FIGS. 5 through 9, such as rewriting of BKoffset as 80 and the judgement at S47 as 80 and substitution of the parts at S90 through S92 with those for black.

In the case of printing three times to finish, such patterns as indicated in FIG. 16E through 16G may be utilized. Not confined to the above described examples of patterns, a variety of patterns may be utilized through setting with the number of print times at designing.

The above described printing method prints by a plurality of time of scanning even if the image to be printed is in black only. However, any substantial degradation in image quality is observed in the printing of such as text image by single-time scan. In this case, printing of the above described six recording areas can be performed by a single scan through utilization of all the dots on the black head. This will realize a high-speed printing. In such a case as trial print where the image quality does not matter, a mode where the 100%-printing is finished by one scan without image formation through a plurality of times of image formation. These various types of printing methods may be incorporated into a constitution so as to be switched for selective use.

The above described print control can be adopted for a variety of types of serial printers other than the ink jet type, such as the dot impact type and the thermal transfer printing type.

As elucidated in the descriptions above, according to the present invention, since the linear patterns are utilized for printing in the print area which includes the top end of an image to be printed, the image quality of a straight line part can be specially improved. For example, the edge parts are printed sharply in the images where tables and underlines are present in mixture, and a further incorporation of the skip of the areas where no images exist will provide much sharper images since the probability of printing the tip of edge parts of tables and underlines in a striped pattern is high.

Since the parts other than the top end are printed with utilization of the patterns where each dot makes as little contact with others as possible, the image quality in extensive areas can be improved. In this way, the image quality in both the extensive image areas and the straight line parts can be improved.

Furthermore, since each printing area is a half or less of the print width capable of printing by one scan and the head and the record medium are relatively transferred for every printing area at every scan, the joints of printing areas are printed so as to show little and consequently the image quality is much more improved.

Since, if any image to be printed is present at the position of the recording head, the recording head and the recorded medium are relatively transferred in advance of printing from that position to a position where the image to be printed is present, various advantages are effected, such as elimination of unnecessary scans resulting with availability of high-speed printing as a whole.

What is claimed is:

1. A recorder to print prescribed printing areas by a plurality of scans, comprising:

a recording head where a plurality of printing elements are arrayed, and a print control means which determines if said printing area is half or less of the printing width of the recording head and controls printing so that, if said printing area is a half or less of the printing width of the recording head, a horizontally or vertically striped pattern is used to print a portion of the print area at a top of an image to be printed while a checkered pattern is used to print a portion of the printing area that follows the printing area at the top of the image and thus each portion of the said printing area is printed using said pattern so as to fill in each portion of the printing area in a plurality of scans.

2. The recorder of claim 1, wherein said recording head comprises a color head and a black head, wherein a plurality of printing elements arrayed on said color head are divided into printing element groups by each different color and said printing area is a half or less of the smallest printing width of each of the printing element groups.

3. The recorder of claim 2, wherein said print control means controls printing in such a manner that, if the image to be printed is not present at the position of said recording head, said recording head is moved relative to a recording medium to a position where the image to be printed is present in advance of printing.

4. The recorder of claim 3, wherein
said print control means controls printing in such a manner that said checkered pattern is used to print said printing areas that include a tail of the image, if the image extends over a plurality of said printing areas.

5. The recorder of claim 2, wherein
said print control means controls printing in such a manner that said checkered pattern is used to print said printing areas that include a tail of the image, if the image extends over a plurality of said printing areas.

6. The recorder of claim 1, wherein
said print control means controls printing in such a manner that, if the image to be printed is not present at the position of said recording head, said recording head is moved relative to a recording medium to a position where the image to be printed is present in advance of printing.

7. The recorder of claim 3, wherein
said print control means controls printing in such a manner that said checkered pattern is used to print said printing areas that include a tail of the image, if the image extends over a plurality of said printing areas.

8. The recorder of claim 1, wherein
said print control means controls printing in such a manner that said checkered pattern is used to print said printing areas that include a tail of the image, if the image extends over a plurality of said printing areas.

9. A print control method to print prescribed printing areas by plurality of scans, comprising the steps of:
determining if said printing area is a half or less of the printing width capable of being printed by one scan,
using a horizontally or vertically striped pattern to print said printing area at a top of an image to be printed if said printing area is a half or less of the printing width capable of being printed by one scan,
using a checkered pattern to print said printing areas that follow said printing area at the top of the image, and
printing each of said printing areas with each of said patterns so as to fill in each area in the plurality of scans.

10. The print control method of claim 9, wherein printing includes printing with a recording head comprising a color head and a black head and wherein if said color head has a different printing width for each color, said printing area is a half or less of the smallest printing width of each of said printing widths.

11. The print control method of claim 10, wherein
further comprising the steps of determining if the image to be printed is not present at the position of said recording head, and if not, moving said recording head to a position relative to a recording medium where the image to be printed is present in advance of printing.

12. The print control method of claim 11, wherein
if the image to be printed extends over a plurality of said printing areas,
said checkered pattern is used to print said printing areas that include a tail of said image.

13. The print control method of claim 10, wherein
if the image to be printed extends over a plurality of said printing areas,
said checkered pattern is used to print said printing areas that include a tail of said image.

14. The print control method of claim 9,
further comprising the steps of determining if the image to be printed is not present at the position of said recording head, and if not, moving said recording head relative to a recording medium to a position where the image to be printed is present in advance of printing.

15. The print control method of claim 14, wherein
if the image to be printed extends over a plurality of said printing areas,
said checkered pattern is used to print said printing areas that include a tail of said image.

16. The print control method of claim 9, wherein
if the image to be printed extends over a plurality of said printing areas,
said checkered pattern is used to print said printing areas that include a tail of said image.

* * * * *